(12) United States Patent
Tashiro

(10) Patent No.: US 10,848,682 B2
(45) Date of Patent: Nov. 24, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hideyasu Tashiro, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/555,199

(22) Filed: Aug. 29, 2019

(65) Prior Publication Data
US 2020/0077008 A1 Mar. 5, 2020

(30) Foreign Application Priority Data

Sep. 3, 2018 (JP) .................................. 2018-164406

(51) Int. Cl.
*H04N 5/235* (2006.01)
*H04N 5/357* (2011.01)

(52) U.S. Cl.
CPC ......... *H04N 5/2352* (2013.01); *H04N 5/2355* (2013.01); *H04N 5/357* (2013.01)

(58) Field of Classification Search
CPC ..... H04N 5/2352; H04N 5/2355; H04N 5/357
See application file for complete search history.

(56) References Cited

U.S. PATENT DOCUMENTS

| 10,275,897 B2 | 4/2019 | Tashiro | |
| 2010/0026823 A1* | 2/2010 | Sawada | G06T 5/50 348/222.1 |
| 2013/0016253 A1* | 1/2013 | Kobayashi | H04N 5/357 348/239 |
| 2013/0136364 A1* | 5/2013 | Kobayashi | G06T 7/215 382/195 |
| 2019/0306399 A1* | 10/2019 | Fujinami | H04N 5/35581 |

FOREIGN PATENT DOCUMENTS

JP 2015050733 A 3/2015

* cited by examiner

*Primary Examiner* — Nhan T Tran
(74) *Attorney, Agent, or Firm* — Carter, DeLuca & Farrell LLP

(57) ABSTRACT

An object of the technique of the present disclosure is to reduce the noise gap that appears at the boundary between light and dark portions in HDR composition of images captured in a time-division manner. The technique of the present disclosure comprises: an obtaining unit configured to obtain a plurality of captured images of an object captured under exposure conditions having different SN ratio characteristics; a combining unit configured to generate a high-dynamic range image by combining the plurality of captured images; a division unit configured to divide the generated high-dynamic range image into a plurality of regions; a derivation unit configured to derive a noise gap amount representing the difference in noise amount between the divided regions obtained by the division; and an updating unit configured to update at least one of the exposure conditions on the basis of the noise gap amount.

20 Claims, 17 Drawing Sheets

IMAGE PROCESSING APPARATUS, IMAGE PROCESSING METHOD, AND STORAGE MEDIUM

BACKGROUND OF THE INVENTION

Field of the Invention

The technique of the present disclosure relates to a technique for generating an HDR image.

Description of the Related Art

In high-dynamic range (HDR) composition of images captured repetitively in a time-division manner with different sensor sensitivities, the difference in sensor sensitivity and exposure correction in the composition sometimes result in a difference in noise characteristic between a light portion and a dark portion in the HDR image, so that a noise gap appears at the boundary between the light and dark portions. Heretofore, various methods to reduce deterioration in image quality of light and dark portions have been proposed. Japanese Patent Laid-Open No. 2015-50733 discloses a method including detecting a dark portion from a captured image, setting the exposure such that the average luminance of the dark portion region can be an intermediate value between the exposure for the captured image and adequate exposure, and combining an image captured again with the set exposure, to thereby reduce noise in the dark portion.

SUMMARY OF THE INVENTION

However, with the method disclosed in Japanese Patent Laid-Open No. 2015-50733, the combined image may possibly have a difference in noise characteristic between a light portion and the dark portion as compared to the captured image, since the image of the dark portion to be combined is captured with intermediate exposure between the exposure for the captured image and the adequate exposure. For this reason, in the HDR composition using the method disclosed in Japanese Patent Laid-Open No. 2015-50733, a noise gap may possibly appear at the boundary between the light and dark portions in the HDR image as well. In view of this, an object of the technique of the present disclosure is to provide an image processing apparatus capable of reducing the noise gap that appears at the boundary between light and dark portions in HDR composition of images captured in a time-division manner.

An image processing apparatus according to the technique of the present disclosure comprises: an obtaining unit configured to obtain a plurality of captured images of an object captured under exposure conditions having different SN ratio characteristics; a combining unit configured to generate a high-dynamic range image by combining the plurality of captured images; a division unit configured to divide the generated high-dynamic range image into a plurality of regions; a derivation unit configured to derive a noise gap amount representing a difference in noise amount between the divided regions obtained by the division; and an updating unit configured to update at least one of the exposure conditions on a basis of the noise gap amount.

Further features of the technique of the present disclosure will become apparent from the following description of exemplary embodiments with reference to the attached drawings.

DESCRIPTION OF THE EMBODIMENTS

Embodiments of the technique of the present disclosure will be described below with reference to the drawings. It should be noted that the following embodiments do not limit the technique of the present disclosure and that not all of the combinations of the features described in the present embodiments are necessarily essential for solving the problem to be solved by the technique of the present disclosure. Meanwhile, the description will be given with the same reference sign given to identical components.

First Embodiment

Figure 1:
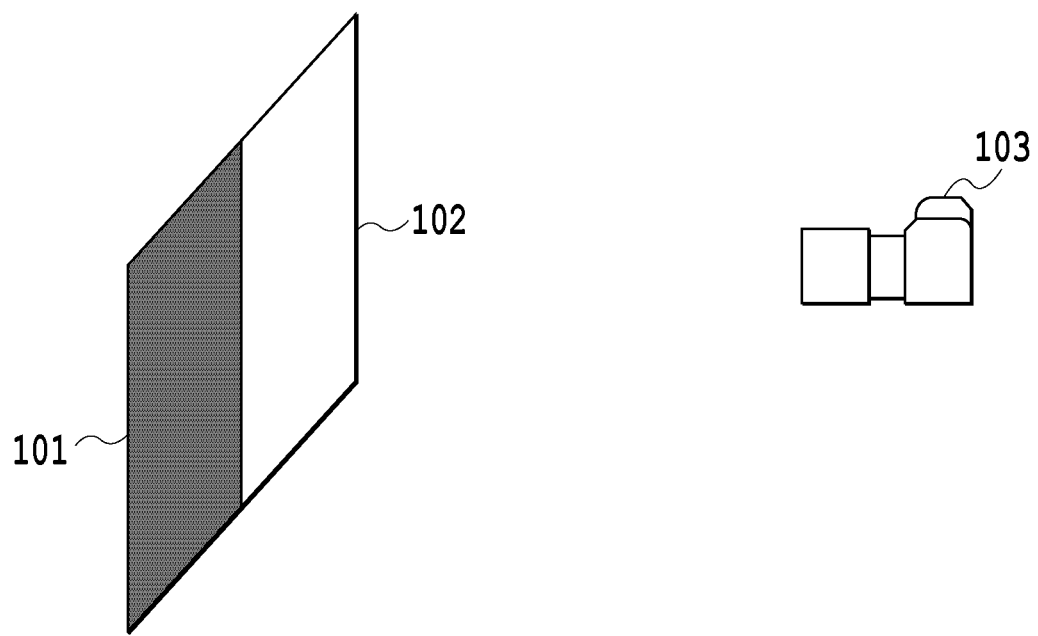
FIG. 1 is a diagram showing how images of an object having a dark portion and a light portion are captured by an image capturing apparatus.
Figure 2A:
FIG. 2A is a diagram for explaining time-division image capturing.
Figures 2B, 2C:
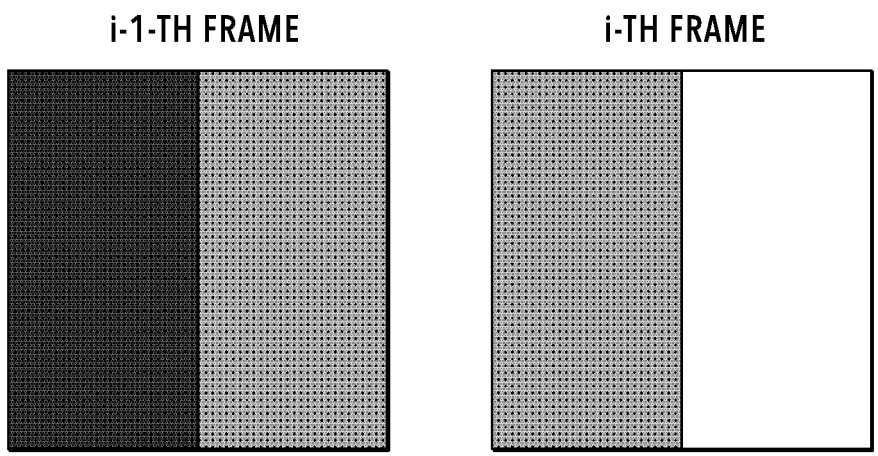
FIG. 2B is a diagram for explaining the time-division image capturing.
FIG. 2C is a diagram for explaining the time-division image capturing.

In the present embodiment, a case will be exemplarily discussed in which, as shown in FIG. 1, temporally divided images of an object at rest with a wide dynamic range having a dark portion 101 and a light portion 102 are captured by continuous image capturing under different exposure conditions (different sensor sensitivities in the present embodiment) with an image capturing apparatus 103. FIGS. 2A to 2C are diagrams for explaining time-division image capturing and time-division images obtained by the time-division image capturing. FIG. 2A shows a time line indicating the exposure start and end timings for frame images obtained by the time-division image capturing. The i−1-th frame image (hereinafter described as the frame image i−1) is captured with a low sensor sensitivity (also referred to as ISO sensitivity) $ISO_S$ and an exposure time $T_S$. On the other hand, the i-th frame image (hereinafter described as the frame image i) is captured with a sensor sensitivity $ISO_L$ higher than the sensor sensitivity $ISO_S$ and an exposure time $T_L$. Meanwhile, the frame images are continuously captured at a time interval $T_{FPS}$. FIG. 2B shows the frame image i−1 among the captured images. The frame image i−1 is a low-exposure image captured with the sensor sensitivity $ISO_S$, which receives a small exposure amount. For this reason, the region corresponding to the light portion 102 of the frame image i−1 is captured at an appropriate exposure level, whereas the region corresponding to the dark portion 101 of the frame image i−1 is dark and has a high noise. FIG. 2C shows the frame image i among the captured images. The frame image i is a high-exposure image captured with the sensor sensitivity $ISO_L$, which receives a large exposure amount. For this reason, the pixel values corresponding to the light portion 102 of the frame image i are saturated, whereas the region corresponding to the dark portion 101 of the frame image i is captured at an appropriate exposure level and has a low noise.

Figure 3:
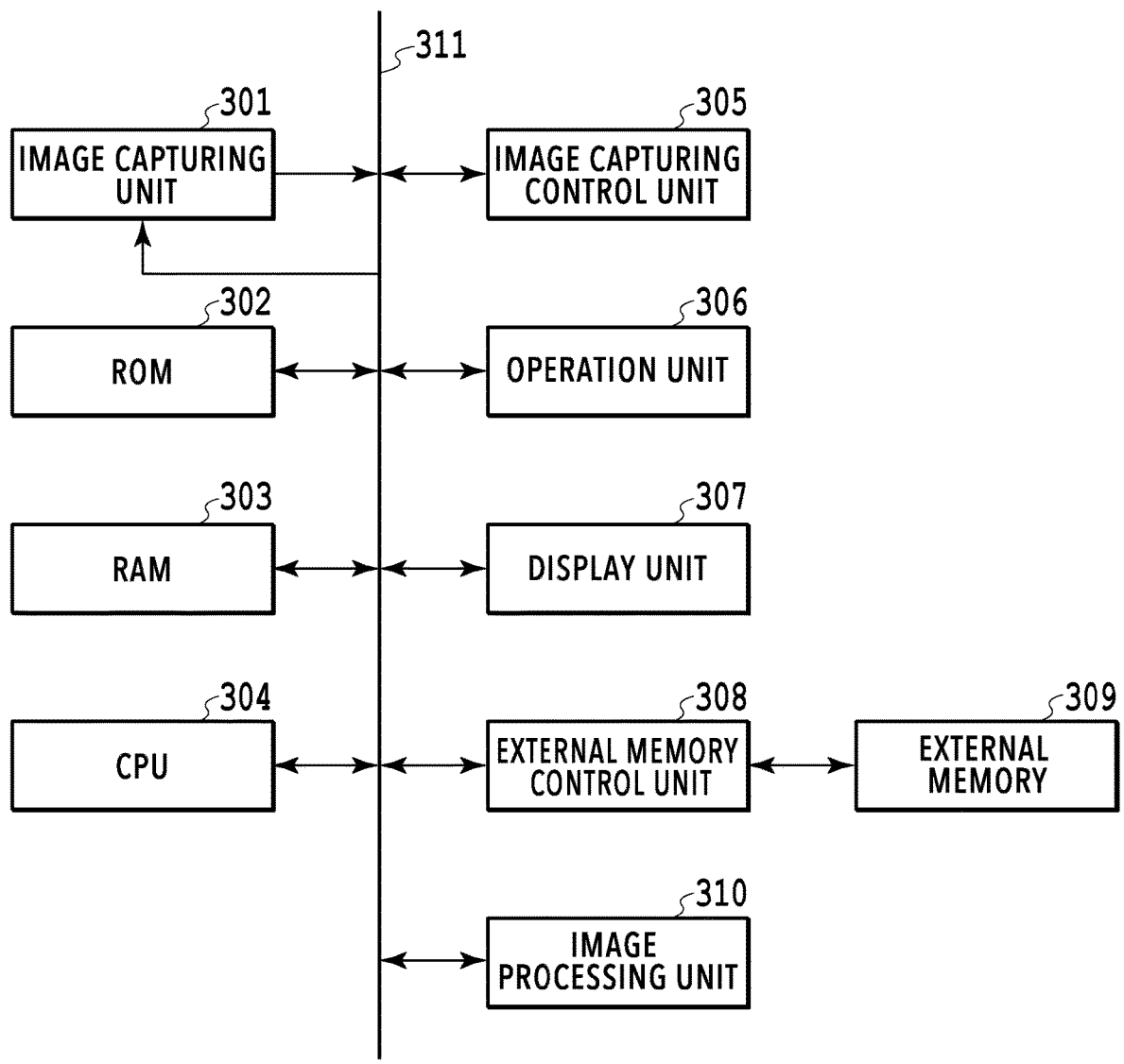
FIG. 3 is a diagram showing the system configuration of the image capturing apparatus shown in FIG. 1.

FIG. 3 is a diagram showing the system configuration of the image capturing apparatus 103, shown in FIG. 1. The image capturing apparatus 103 comprises an image capturing unit 301, an ROM 302, an RAM 303, a CPU 304, an image capturing control unit 305, an operation unit 306, a display unit 307, and an external memory control unit 308. These constituent elements are connected to each other by a bus 311 serving as a data transfer path. The image capturing unit 301 has a lens, an iris, a shutter, an optical low-pass filter, a color filter, and a sensor such as a CMOS or a CCD. The image capturing unit 301 detects the light amount of reflected light reflected by an object, performs A/D conversion on the detected light amount, and outputs the resultant digital data to the bus 311. The ROM 302 and the RAM 303 provide the CPU 304 with a program, data, a work area, and so on necessary for image capturing and image processing. The CPU 304 reads out the program stored in the ROM 302 or the RAM 303 and execute it with the RAM 303 as a work memory to control components through the bus 311. As a result, various processes to be described later (e.g., the processes shown in FIGS. 5, 7, 9, and 17) are executed. The image capturing control unit 305 controls the image capturing unit 301 to bring the object into focus, open the shutter, and adjust the iris. The operation unit 306 is, for example, buttons and a mode dial. Through the operation unit 306, the user can input various instructions for turning the power on, setting process parameters, and so on into the image capturing apparatus 103. The display unit 307 is, for example, a liquid crystal display and displays a captured image and character information received from the image processing unit 310. Note that the display unit 307 may have a touchscreen function. Further, the display unit 307 may function as the operation unit 306 for inputting user instructions. The external memory control unit 308 is an interface to connect the image capturing apparatus 103 to a personal computer (PC) or an external memory 309 (e.g., a hard disk drive, a memory card, a CF card, an SD card, or a USB memory). The image processing unit (hereinafter also referred to as the image processing apparatus) 310 performs image processing on a digital image obtained from the image capturing unit 301 to thereby generate a new image, and outputs the generated image to the bus 311.

Figure 4:
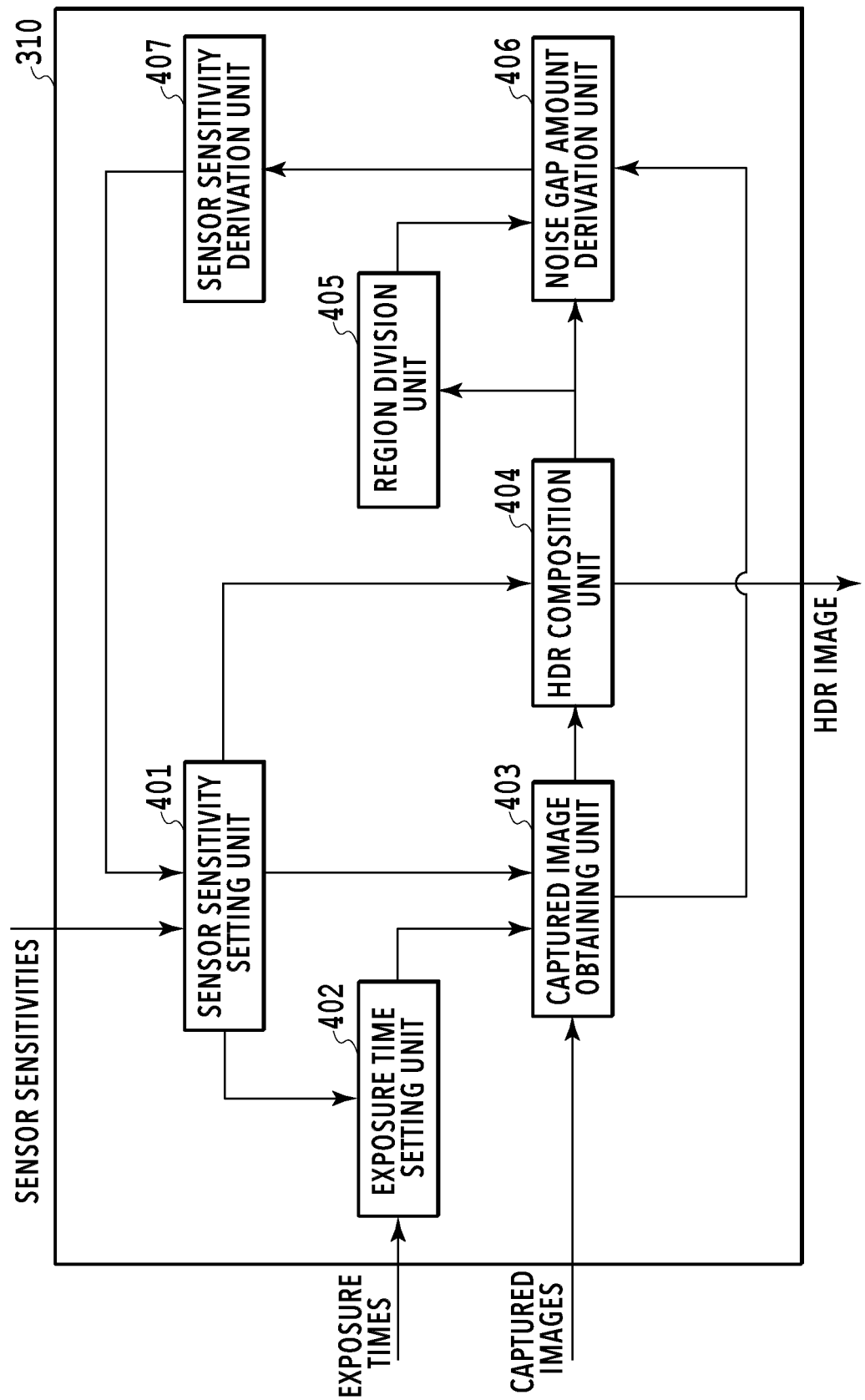
FIG. 4 is a block diagram showing functions of an image processing unit in the image capturing apparatus according to a first embodiment.

FIG. 4 is a block diagram showing functions of the image processing unit 310 in the image capturing apparatus 103 according to the first embodiment. A sensor sensitivity setting unit 401 sets a plurality of sensor sensitivities for image capturing of an object on the image capturing unit 301 through the bus 311. The sensor sensitivity setting unit 401 outputs the set sensor sensitivities to a captured image obtaining unit 403 and a high-dynamic range (HDR) composition unit 404. An exposure time setting unit 402 sets a plurality of exposure times for the image capturing of the object through the bus 311. The exposure time setting unit 402 outputs the set exposure times to the captured image obtaining unit 403. The captured image obtaining unit 403 obtains images (captured images) of the object continuously captured with the sensor sensitivities set by the sensor sensitivity setting unit 401 from the image capturing unit 301. The captured image obtaining unit 403 outputs the obtained captured images to the HDR composition unit 404 and a noise gap amount derivation unit 406. The HDR composition unit 404 combines the captured images on the basis of the captured images and the sensor sensitivities to thereby generate an HDR image, and outputs the HDR image to the noise gap amount derivation unit 406 and the bus 311. A region division unit 405 divides the captured images and the HDR image into a plurality of regions and outputs information (e.g., coordinates) on the regions thus divided (hereinafter referred to as the divided regions) to the noise gap amount derivation unit 406. The noise gap amount derivation unit 406 derives the amount of the noise gap appearing between the divided regions due to the HDR composition from the captured images, the HDR image, and the information on the divided regions, and outputs the derived noise gap amount to a sensor sensitivity derivation unit 407. The sensor sensitivity derivation unit 407 derives sensor sensitivities that reduce the noise gap appearing in the HDR image from the noise gap amount, and outputs the derived sensor sensitivities to the sensor sensitivity setting unit 401.

(Operation of Image Processing Unit 310)

Figure 5:
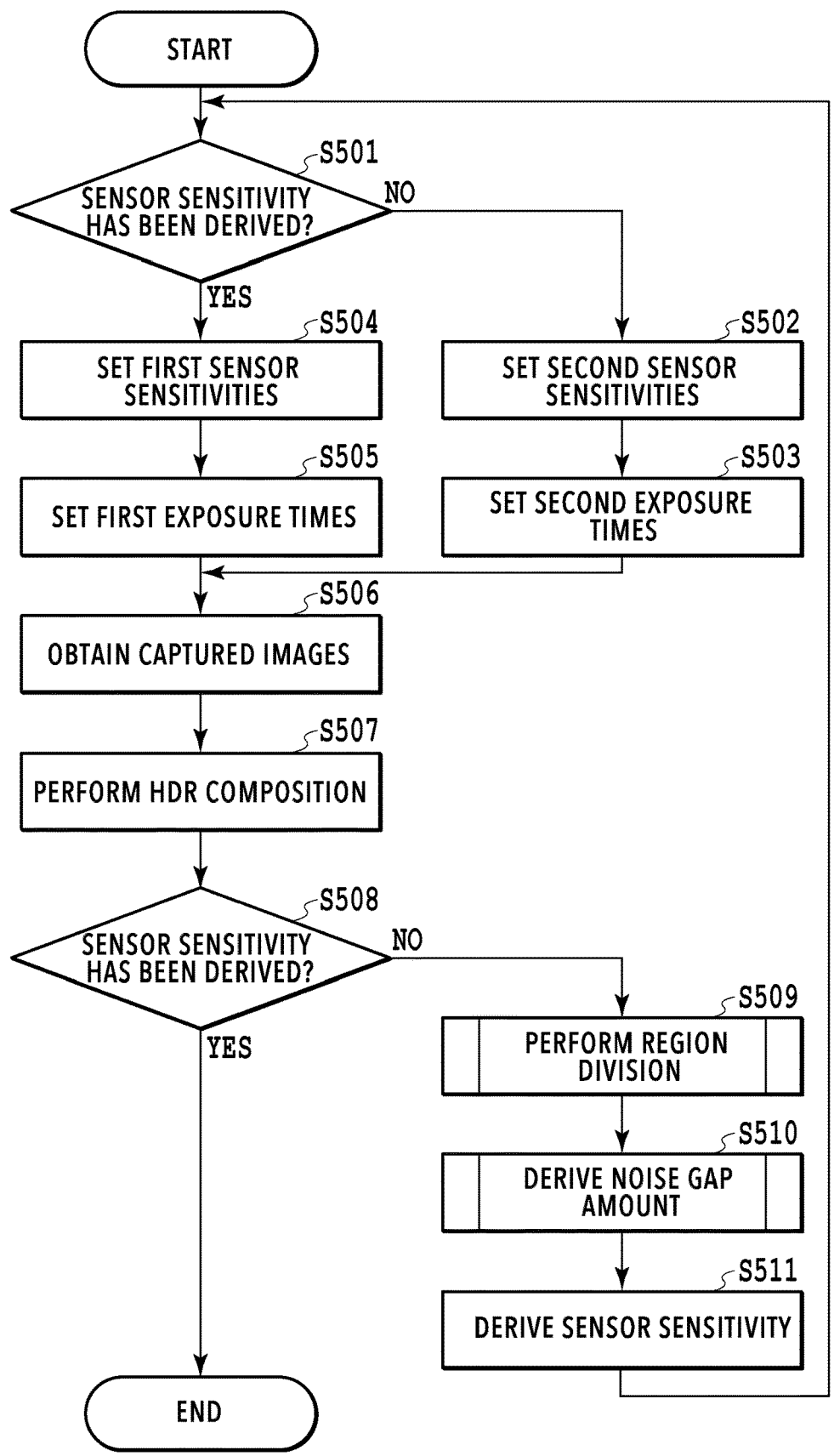
FIG. 5 is a flowchart of a process executed by the image processing unit in the first embodiment.

FIG. 5 is a flowchart of a process executed by the image processing unit 310 in the first embodiment. The CPU 304 performs this process by reading out a program in which the flow shown in FIG. 5 is described from the ROM 302, writing the program to the RAM 303, and executing the program.

Firstly, the sensor sensitivity setting unit 401 determines whether first sensor sensitivities are stored in a storage region such as the ROM 302 or the RAM 303 (hereinafter referred to as the predetermined storage region) (S501). The first sensor sensitivities are sensor sensitivities that reduce the noise gap, and is derived in S511 to be described later.

If the first sensor sensitivities are not stored (NO in S501), the sensor sensitivity setting unit 401 sets second sensor sensitivities designated by the user and stored in the predetermined storage region as the sensor sensitivities for captured images to be obtained in S506 to be described later (S502). In the present embodiment, $ISO_{S2}=800$ and $ISO_{L2}=12800$ are set as the second sensor sensitivities. Then, the exposure time setting unit 402 sets second exposure times designated by the user and stored in the predetermined storage region as the exposure times for the captured images to be obtained in S506 to be described later. In the present embodiment, $T_{S2}=\frac{1}{120}$ (sec) and $T_{L2}=\frac{1}{120}$ (sec) are set as the second exposure times. Note that the second sensor sensitivities and the second exposure times are designated for the sensor sensitivity setting unit 401 in advance by the user through the operation unit 306. Also, the sensor sensitivity setting unit 401 stores the user-designated second sensor sensitivities and second exposure times in the predetermined storage region.

On the other hand, if the first sensor sensitivities are set (YES in S501), the sensor sensitivity setting unit 401 sets the first sensor sensitivities as the sensor sensitivities for the captured images to be obtained in S506 to be described later. In the present embodiment, $ISO_{S1}=200$ and $ISO_{L1}=12800$ are derived as the first sensor sensitivities in S511 to be described later, and the derived values are stored in the predetermined storage region. Then, the exposure time setting unit 402 sets exposure times $T_{S1}$ and $T_{L1}$ from the first sensor sensitivities $ISO_{S1}$ and $ISO_{L1}$, the second sensor sensitivities $ISO_{S2}$ and $ISO_{L2}$, and the second exposure times $T_{S2}$ and $T_{L2}$ in accordance with equation (1) below.

$$\frac{T_{S1}}{T_{L1}} = \frac{ISO_{L1}}{ISO_{L2}} \cdot \frac{ISO_{S2}}{ISO_{S1}} \cdot \frac{T_{S2}}{T_{L2}} \qquad \text{Equation (1)}$$

$T_{S1}$ and $T_{L1}$ are exposure times set for capturing the frame images i−1 and i with the first sensor sensitivities $ISO_{S1}$ and $ISO_{L1}$. In the present embodiment, as mentioned above, $ISO_{S1}=200$ and $ISO_{L1}=12800$ are set as the first sensor sensitivities, and $ISO_{S2}=800$ and $ISO_{L2}=12800$ are set as the second sensor sensitivities. Thus, $T_{S1}=\frac{1}{30}$ (sec) from equation (1) with $T_{S2}=\frac{1}{120}$ (sec), $T_{L2}=\frac{1}{120}$ (sec), and $T_{L1}=\frac{1}{120}$ (sec). The set exposure times $T_{S1}$ and $T_{L1}$ are stored in the predetermined storage region.

Then, the captured image obtaining unit 403 captures images of the object with the sensor sensitivities and the exposure times set in S502 and S503 or in S504 and S505 to obtain captured images (S506). The obtained captured images are stored in the predetermined storage region. Then, the HDR composition unit 404 combines the frame images i−1 and i into an HDR image by using a publicly known tone mapping algorithm (S507). In the present embodiment, in a case where the HDR composition is performed using images captured with the user-designated second sensor sensitivities, an image obtained by performing exposure correction on the frame image i is attached to the left region in the HDR image (the region where the dark portion 101 of the object appears). For this reason, the left region in the HDR image has a lower noise than the left region in the frame image i−1. On the other hand, the image of the frame image i−1 is attached as is to the right region in the HDR image (the region where the light portion 102 appears), so that an HDR image having the same noise characteristic as the right region in the frame image i−1 is obtained. The image obtained by the HDR composition (HDR image) is stored in the predetermined storage region.

Then, the region division unit 405 determines whether the first sensor sensitivities are stored in the predetermined storage region (S508). If the first sensor sensitivities are stored (YES in S508), the region division unit 405 determines that an HDR image with a reduced noise gap has been obtained in S507. The process is then terminated. Note that the flow shown in FIG. 5 is repetitively executed in a case of capturing a moving image of the object. If the first sensor sensitivities are not stored (NO in S508), the region division unit 405 determines that processes of deriving divided regions, the noise gap amount, and sensor sensitivities that reduce the noise gap (the processes in S509, S510, and S511 to be described later) have not been performed. The region division unit 405 then proceeds to the process in S509.

Figure 6:
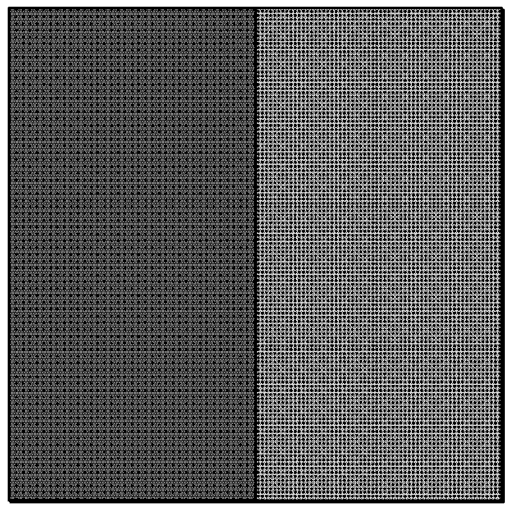
FIG. 6 is a diagram schematically showing an HDR image obtained by combining images captured with second sensor sensitivities.
Figure 7:
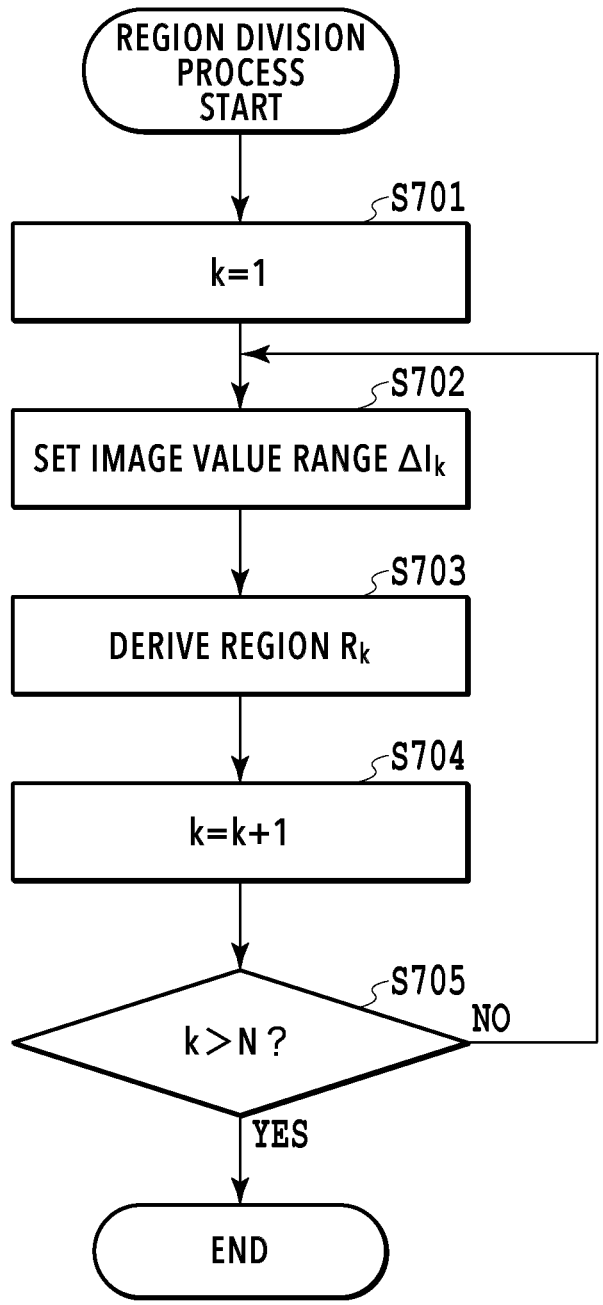
FIG. 7 is a flowchart showing a region division process.

The region division unit 405 divides the frame images i−1 and i, shown in FIGS. 2B and 2C, and the image obtained by the HDR composition of the frame images i−1 and i (the HDR image shown in FIG. 6) into a plurality of regions in accordance with the flow shown in FIG. 7 (S509). Note that details of the process in S509 (region division process) will be described later. In the present embodiment, in S509, the dark portion 101 and the light portion 102 of the object are derived as a region $R_{kA}$ and a region $R_{kB}$ shown in FIGS. 8A and 8B to be described later, respectively. Information (such as coordinates) enabling identification of the regions obtained by the region division process is stored in the predetermined storage region.

Figure 9:
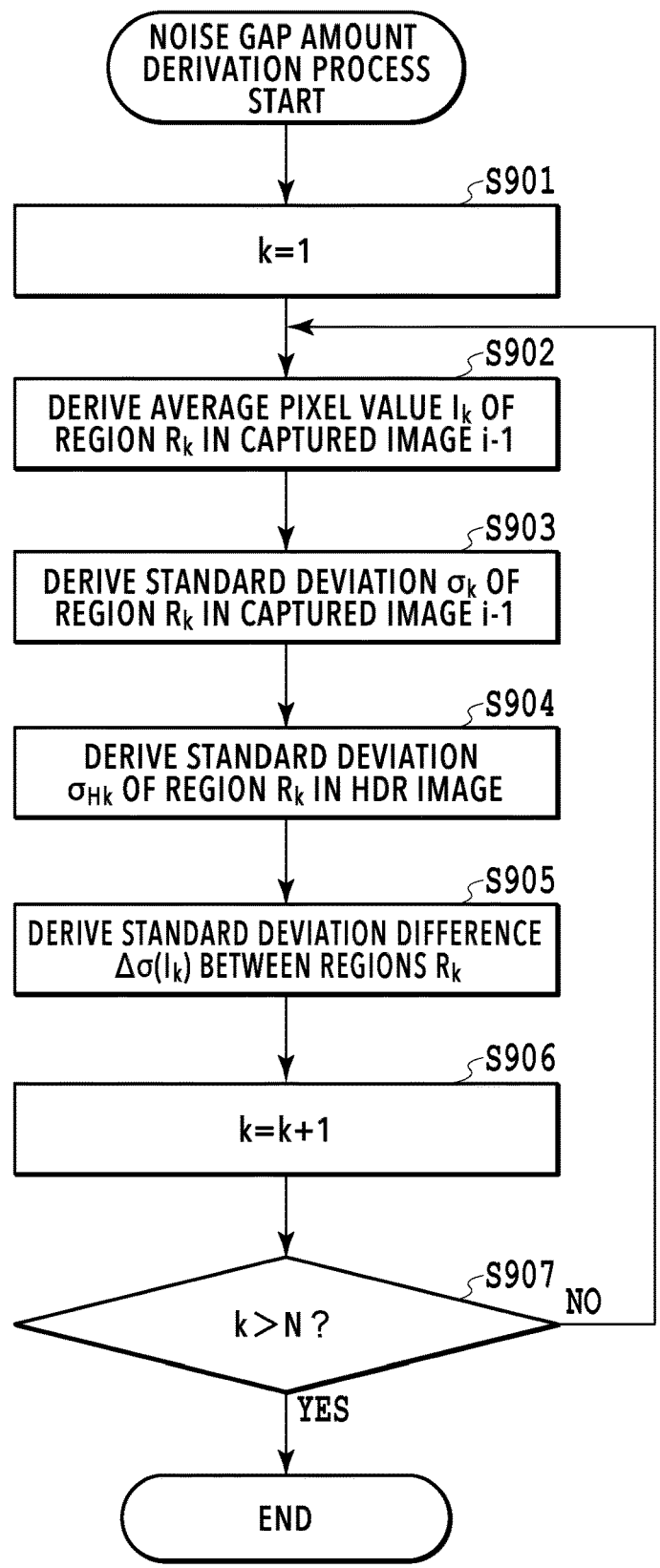
FIG. 9 is a flowchart showing a noise gap amount derivation process.
Figure 10:
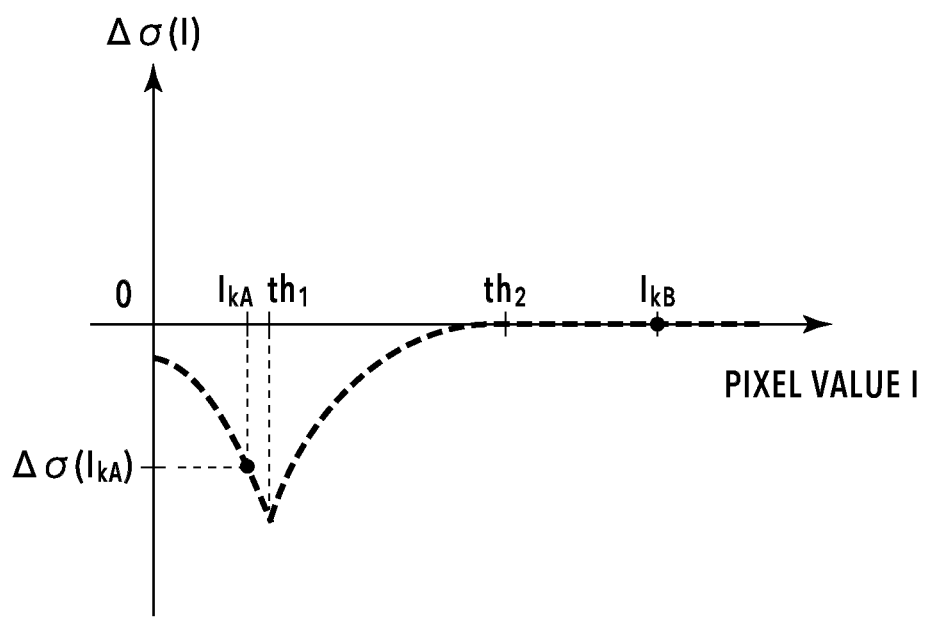
FIG. 10 is a diagram for explaining a noise gap amount.

Then, the noise gap amount derivation unit 406 derives the noise gap amount of the HDR combined image for the low-exposure frame image i−1, shown in FIG. 2B, in accordance with the flow shown in FIG. 9 (S510). Details of the noise gap amount derivation process will be described later. FIG. 10 is a graph obtained by plotting a difference $\Delta\sigma(I_k)$ in standard deviation of a divided region $R_k$ having an average pixel value $I_k$. The horizontal axis represents the average pixel value $I_k$ of the region $R_k$ while the vertical axis represents the difference $\Delta\sigma(I_k)$ in standard deviation of the region $R_k$. $th_1$ and $th_2$ represent a pixel value range within which the HDR composition is performed. The frame image i is attached to pixel regions where $I_k<th_1$ while the frame image i−1 is attached to pixel regions where $I_k>th_2$. An image obtained by performing a blending on the frame image i−1 and the frame image i with weighting corresponding to their pixel values is attached to each pixel region where $th_1<I_k<th_2$. The curve illustrated with a dotted line represents a difference $\Delta\sigma(I)$ in standard deviation between regions R having average pixel values I, the difference $\Delta\sigma(I)$ being derived from the sensor sensitivities. As shown in FIG. 10, in a case where $I<th_1$, the frame image i after exposure correction is attached. Thus, due to the difference in sensor sensitivity between the frame image i−1 and the frame image i and the exposure correction for the frame image i, the difference $\Delta\sigma(I)$ in standard deviation monotonically decreases as the pixel value I increases. In a case where $I>th_2$, the frame image i−1 is attached and therefore the difference $\Delta\sigma(I)$ in standard deviation is 0. In a case where $th_1<I_k<th_2$, the frame image i−1 and the frame image i undergo the α blending. Thus, the difference $\Delta\sigma(I)$ in standard deviation monotonically increases toward 0 as the pixel value I increases. In the present embodiment, in the region $R_{kA}$ in the HDR image, $I_{kA}<th1$, and the corresponding region in the frame image i after the exposure correction is attached. Accordingly, the noise is lower than that in the region $R_{kA}$ in the frame image i−1. Hence, the difference $\Delta\sigma(I_{kA})$ in standard deviation<0 from equation (4) to be mentioned later. Also, in the region $R_{kB}$ in the HDR image, $I_{kB}>th_2$, and the frame image i−1 is attached. Hence, the difference $\Delta\sigma(I_{kB})$ in standard deviation=0. The noise gap amount derivation unit 406 stores the derived noise gap amount $\Delta\sigma(I)$ in the predetermined storage region.

Then, the sensor sensitivity derivation unit 407 derives a sensor sensitivity having an SN ratio characteristic satisfying equation (2) below as a first sensor sensitivity that reduces the noise gap (S511).

$$SN(I_{kA}) = \frac{I_{kA}}{\sigma_{kA}(I_{kA}) + \Delta\sigma(I_{kA})} \qquad \text{Equation (2)}$$

Figure 11:
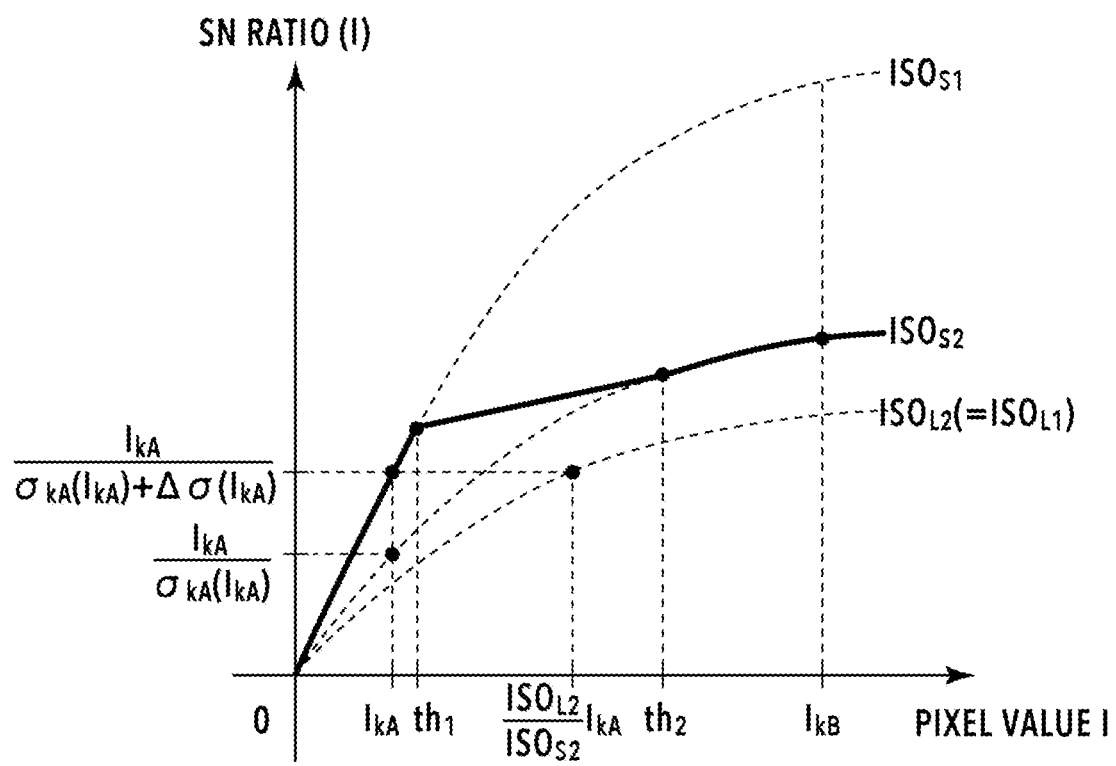
FIG. 11 is a graph showing SN ratio characteristics.

$I_{kA}$ and $\sigma_{kA}(I_{kA})$ are the average pixel value in the region $R_k$ of the frame image i−1 derived in S902 to be described later and the noise amount. $\Delta\sigma(I_{kA})$ is the noise gap amount at the region $R_k$ derived in S905 to be described later. FIG. 11 is a graph showing SN ratio characteristics used to derive the first sensor sensitivity from the noise gap amount and the second sensor sensitivities. The horizontal axis represents the pixel value I while the vertical axis represents the SN ratio for the pixel value I. Dotted lines $ISO_{S2}$ and $ISO_{L2}$ are curves representing the SN ratio characteristics in the frame images i−1 and i derived from the second sensor sensitivities. The solid line is a curve representing the SN ratio characteristic in the HDR image obtained by combining the frame images i−1 and i. In pixel regions where I<$th_1$, the frame image i after the exposure correction is attached, and thus the pixel regions have an SN ratio characteristic obtained by reducing the curve $ISO_{L2}$ by $ISO_{L2}/ISO_{S2}$ times in the direction of the horizontal axis. In pixel regions where I>$th_2$, the frame image i−1 is attached and thus the pixel regions have the SN ratio characteristic of $ISO_{S2}$. In pixel regions where $th_1$<I<$th_2$, the frame image i−1 and the frame image i undergo the α blending, and thus the pixel regions have an SN ratio characteristic along a curve obtained by interpolating the curve $ISO_{S2}$ and the curve obtained reducing the curve $ISO_{L2}$ by $ISO_{L2}/ISO_{S2}$ times in the direction of the horizontal axis. Dotted lines $ISO_{S1}$ and $ISO_{L1}$ represent the sensor sensitivities for the frame images i−1 and i derived in accordance with equation (2). In the present embodiment, $ISO_{S2}$=800 and $ISO_{L2}$=12800 are set as the second sensor sensitivities. Thus, in a case where $ISO_{L1}$ is set at 12800, $ISO_{S1}$=200, having the same SN ratio characteristic as the curve obtained by reducing $ISO_{L2}$ by $ISO_{L2}/ISO_{S2}$ times in the direction of the horizontal axis, is derived as a sensor sensitivity for the frame image i−1 satisfying equation (2). The sensor sensitivity derivation unit 407 stores the derived sensor sensitivity as the first sensor sensitivity in the predetermined storage region. After S511, the process returns to S501.

(Operation of Region Division Unit 405)

The region division process in S509 will be described using FIG. 7. Firstly, the region division unit 405 initializes a divided region number k to 1 (S701). Then, the region division unit 405 sets a pixel value range $\Delta I_k$ to be designated for the k-th divided region in accordance with inequality (3) below (S702).

$$\frac{k-1}{N} \cdot 255 < \Delta I_k \le \frac{k}{N} \cdot 255 \qquad \text{Inequality (3)}$$

Figures 8A, 8B:
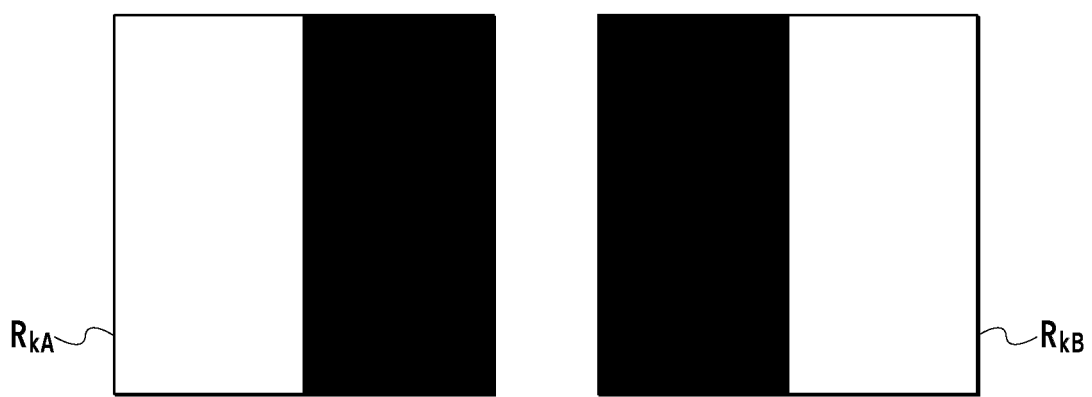
FIG. 8A is a diagram for explaining region division.
FIG. 8B is a diagram for explaining region division.

N is the total number of divided regions. The region division unit 405 stores the set pixel value range $\Delta I_k$ in the predetermined storage region. Then, the region division unit 405 derives the region $R_k$ having pixel values within the range $\Delta I_k$ from the HDR image obtained by the composition in S507 (S703). The region division unit 405 stores information on the derived region $R_k$ (e.g., coordinate information on the region $R_k$) in the predetermined storage region. Then, the region division unit 405 updates the divided region number k by incrementing it by one (k=k+1) (S704). Lastly, the region division unit 405 determines whether it has finished deriving the information on all divided regions (S705). Specifically, the region division unit 405 determines whether the divided region number k is larger than N. If k>N is satisfied (YES in S705), the region division unit 405 determines that it has finished deriving the information on all divided regions, and terminates the process. If k>N is not satisfied (NO in S705), the region division unit 405 returns to the process in S702. In the present embodiment, as shown in FIGS. 8A and 8B, the region corresponding to the dark portion 101 of the object is derived as the region $R_{kA}$ (white portion) shown in FIG. 8A. Also, the region corresponding to the light portion 102 of the object is derived as the region $R_{kB}$ (white portion) shown in FIG. 8B.

(Operation of Noise Gap Amount Derivation Unit 406)

The noise gap amount derivation process in S510 will be described using FIG. 9. Firstly, the noise gap amount derivation unit 406 initializes the divided region number k to 1 (S901). Then, the noise gap amount derivation unit 406 derives the average pixel value $I_k$ of the region $R_k$ in the frame image i−1, which is a low-exposure image for which a low sensor sensitivity is set (S902). The derived average pixel value $I_k$ is stored in the predetermined storage region. Then, the noise gap amount derivation unit 406 derives a standard deviation $\sigma_k$ of the region $R_k$ in the frame image i−1 (S903). The derived standard deviation $\sigma_k$ is stored in the predetermined storage region. Then, the noise gap amount derivation unit 406 derives a standard deviation $\sigma_{Hk}$ of the region $R_k$ in the HDR image (S904). The derived standard deviation $\sigma_{Hk}$ is stored in the predetermined storage region. Then, the noise gap amount derivation unit 406 derives a difference $\Delta\sigma(I_k)$ between the standard deviation $\sigma_{Hk}$ of the region $R_k$ in the HDR image and the standard deviation $\sigma_k$ of the region $R_k$ in the frame image i−1 in accordance with equation (4) below (S905).

$$\Delta\sigma(I_k) = \sigma_{Hk} - \sigma_k \qquad \text{Equation (4)}$$

The derived standard deviation difference $\Delta\sigma(I_k)$ between the regions $R_k$ is stored in the predetermined storage region. Then, the noise gap amount derivation unit 406 updates the divided region number k by incrementing it by one (k=k+1) (S906). Then, the noise gap amount derivation unit 406 determines whether it has finished deriving the noise gap amount for all divided regions (S907). Specifically, the noise gap amount derivation unit 406 determines whether the divided region number k is larger than N. If k>N is satisfied (YES in S907), the noise gap amount derivation unit 406 determines that it has derived the noise gap amount for all divided regions, and terminates the process. If k>N is not satisfied (NO in S907), the noise gap amount derivation unit 406 returns to the process in S902. In the present embodiment, in the region $R_{kA}$ in the HDR image, $I_{kA}$<th1, and the corresponding region in the frame image i after the exposure correction is attached, as described earlier using FIG. 10. For this reason, the region $R_{kA}$ in the HDR image has a lower noise than the region $R_{kA}$ in the frame image i−1. Hence, the standard deviation difference $\Delta\sigma(I_{kA})$<0 from equation (4). Also, in the region $R_{kB}$ in the HDR image, $I_{kB}$>$th_2$ and the frame image i−1 is attached, and therefore the standard deviation difference $\Delta\sigma(I_{kB})$=0.

Figure 12:
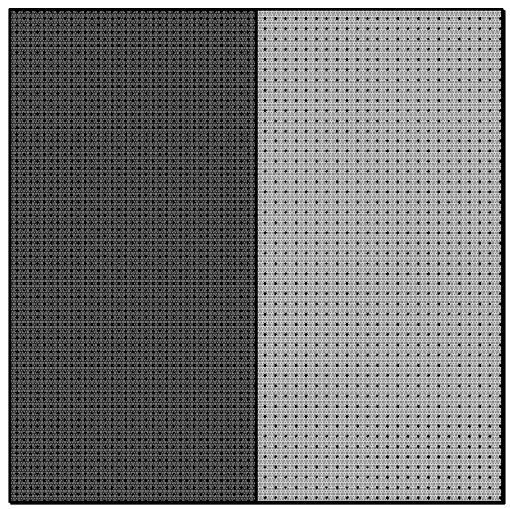
FIG. 12 is a diagram schematically showing an HDR image obtained by combining images captured with first sensor sensitivities.

By performing the above-described image processing, it is possible to derive a sensor sensitivity (first sensor sensitivity) that reduces the noise gap appearing in the HDR image. FIG. 12 is a diagram showing an HDR image obtained by combining an image captured with the first sensor sensitivity. In the present embodiment, $ISO_{S1}$=200, having the same SN ratio characteristic as the curve obtained by reducing $ISO_{L2}$ by $ISO_{L2}/ISO_{S2}$ times in the direction of the horizontal axis, is derived as the first sensor sensitivity for the frame image i−1. Accordingly, the difference in noise characteristic between the light portion and the dark portion is reduced. Hence, according to the present embodiment, it is possible to generate an HDR image as shown in FIG. 12, in which the noise gap between its dark portion and light portion is reduced.

Figure 13A:
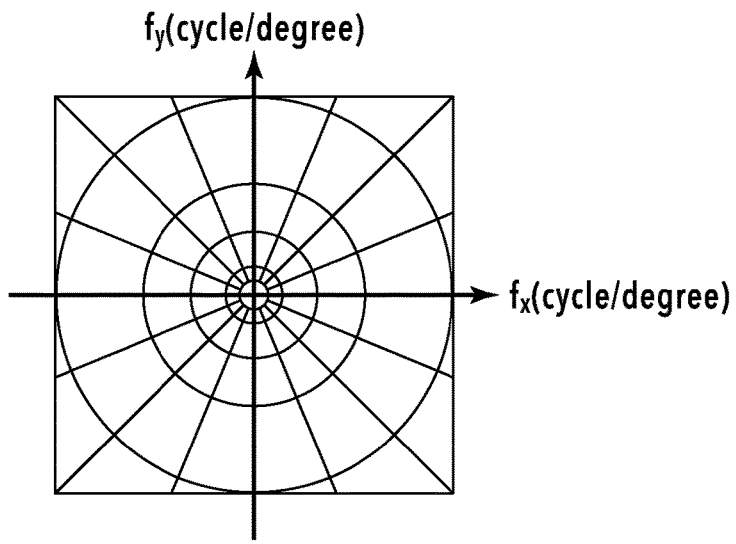
FIG. 13A is a diagram for explaining a region division method based on spatial frequency characteristic components.
Figure 13B:
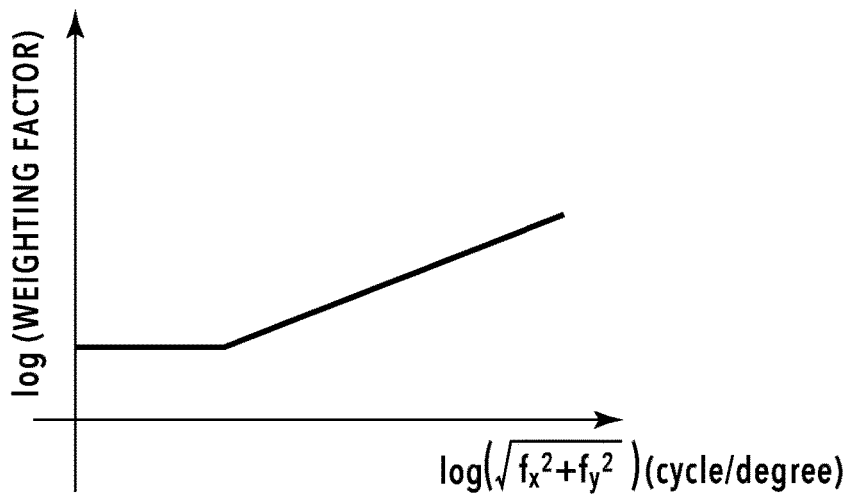
FIG. 13B is a diagram for explaining the region division method based on spatial frequency characteristic components.
Figure 13C:
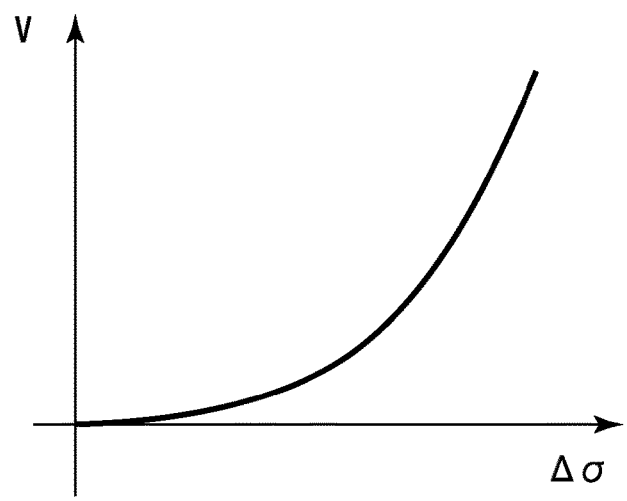
FIG. 13C is a diagram for explaining the region division method based on spatial frequency characteristic components.

Note that in the present embodiment, the captured images and the HDR image are divided into regions according to their pixel values. However, each captured image and the HDR image may be Fourier transformed, and the spatial frequency characteristic components may be divided into a plurality of frequency bands with a publicly known cortex filter by Daly shown in FIG. 13A. In this case, the noise gap amount derivation unit 406 derives a value V by adding the differences in spatial frequency characteristic between the captured image and the HDR image in the plurality of divided frequency bands with the differences weighted according to the frequencies in accordance with a publicly known mask contrast by Daly shown in FIG. 13B. Then, the noise gap amount derivation unit 406 may derive the noise gap amount from a lookup table of the value V and the standard deviation difference Δσ shown in FIG. 13C.

Figure 14:
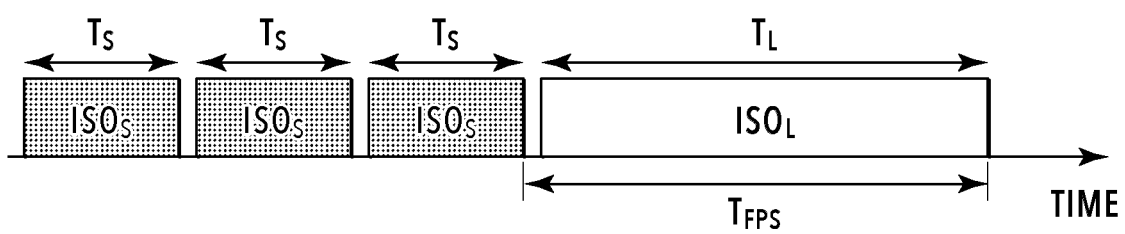
FIG. 14 is a diagram for explaining another example of the time-division image capturing.

Also, in the present embodiment, the method of deriving a sensor sensitivity has been exemplarily described with an image capturing apparatus capable of setting a sensor sensitivity having the SN ratio characteristic shown by equation (2). However, in a case where the image capturing apparatus cannot set a sensor sensitivity having the above SN ratio characteristic, a sensor sensitivity set on the image capturing apparatus and the number of captured images to be added and averaged may be derived. Specifically, a plurality of images captured with the same sensor sensitivity by a high-speed camera capable of successive image capturing at a high frame rate may be added and averaged. In this way, it is possible to obtain an image having a higher SN ratio characteristic than the sensor sensitivity which the image capturing apparatus can set. FIG. 14 shows a time line indicating the exposure start and end timings for capturing three frame images i−11, i−12, and i−13 with a low sensor sensitivity $ISO_S$ and an exposure time $T_s$. In this case, an image obtained as the average of the three frame images i−11, i−12, and i−13 added together is used in the processes in S507, S509 to S510, and so on. Note that in a case where the user sets a mode that prioritizes the noise gap reduction, the sensor sensitivity that reduces the noise gap and the number of captured images to be added and averaged may be derived. On the other hand, in a case where the user sets a mode that prioritizes the reduction of double images appearing on a moving object as a result of adding and averaging a plurality of captured images, the exposure time may be set long by setting the number of captured images to one.

Figure 15:
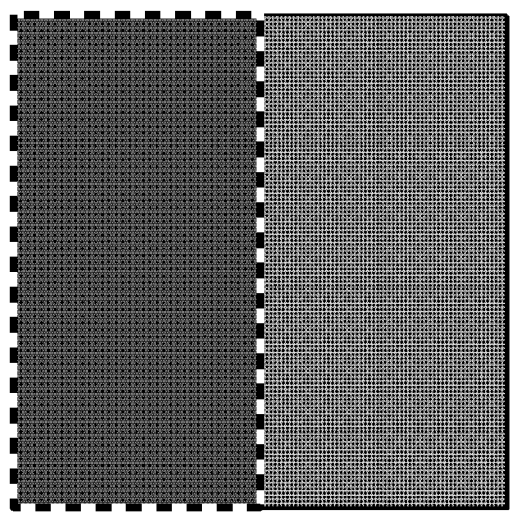
FIG. 15 is a diagram showing an example of a user interface that highlights a region with a large noise gap amount.

Also, display control may be performed which, on a user interface, highlights any divided region $R_k$ where the noise gap amount relative to the average pixel value $I_k$ is larger than a predetermined threshold value. Specifically, the image processing unit 310 may have a display control unit that displays such a user interface on the display unit 307. FIG. 15 is an example of highlighting the divided region $R_{k4}$ with a noise gap amount larger than the predetermined threshold value by surrounding its boundary with a dotted line.

Also, in the present embodiment, the processes in S509 to S511 are skipped if it is determined in S508 that the first sensor sensitivities are stored in the predetermined storage region. However, even if the first sensor sensitivities are stored in the predetermined storage region, the processes in S509 to S511 may be executed in a case where it is determined that the first sensor sensitivities need to be set again. For example, the processes in S509 to S511 may be executed in a case where changes in the maximum pixel value and the minimum pixel value in the entire HDR image are detected. To implement such a configuration, after it is determined YES in S508, the maximum pixel value and the minimum pixel value in the last HDR image and those in the current HDR image may be compared with each other to determine whether the first sensor sensitivities need to be set again.

Also, in the present embodiment, a sensor sensitivity that reduces the noise gap amount is derived in S511. However, in the case where the noise gap amount is a predetermined threshold value or smaller, the process may be skipped, and the second sensor sensitivities may be set as the first sensor sensitivities.

Second Embodiment

Figure 16:
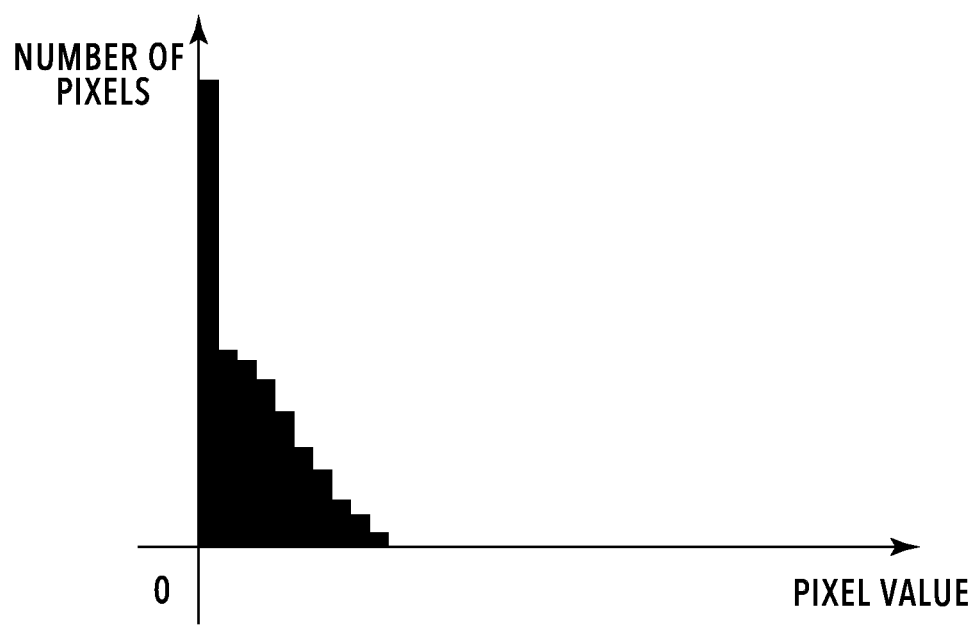
FIG. 16 is a diagram showing an example of a histogram of the pixel values of a divided region corresponding to a dark portion.

In the first embodiment, a description has been given of a method in which captured images and an HDR image are divided into regions, and the noise gap amount is derived from the difference in standard deviation between the divided regions. However, in a case where there is shadow-detail loss in a divided region corresponding to a dark portion, a histogram of the pixel values of the divided region corresponding to the dark portion is not a normal distribution, as shown in FIG. 16. This may possibly lower the accuracy of derivation of the noise gap amount. In the present embodiment, a description will be given of a method of accurately deriving the noise gap amount even in the case where there is shadow-detail loss in the divided region corresponding to the dark portion.

Figure 17:
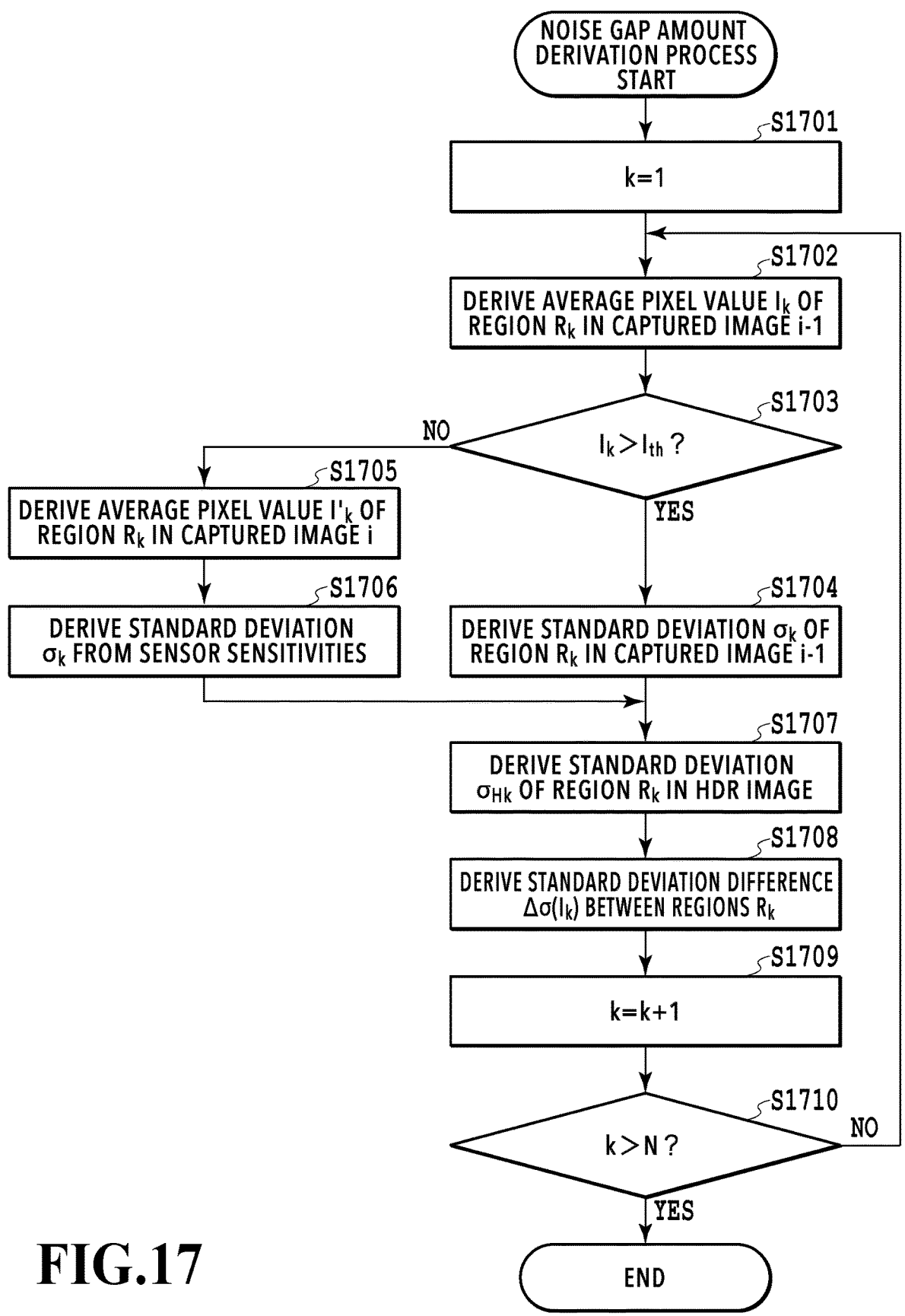
FIG. 17 is a flowchart of a process executed by an image processing unit in a second embodiment.

FIG. 17 is a flowchart showing a noise gap amount derivation process in the second embodiment. Note that the processes in S1701, S1702, and S1704 to S1710 in FIG. 17 are similar to the processes in S901, S902, and S903 to S907 in FIG. 9, and description thereof is therefore omitted.

After S1702, the noise gap amount derivation unit 406 determines whether the average pixel value $I_k$ of the region $R_k$ in the frame image i−1, derived in S1702, is larger than a threshold value $I_{th}$ (S1703). If $I_k > I_{th}$ is satisfied (YES in S1703), the noise gap amount derivation unit 406 determines that there is no shadow-detail loss in the region $R_k$, and proceeds to the process in S1704. If $I_k > I_{th}$ is not satisfied (NO in S1703), the noise gap amount derivation unit 406 determines that there is shadow-detail loss in the region $R_k$. Then, the noise gap amount derivation unit 406 derives an average pixel value I'k of the region $R_k$ in the frame image i (S1705). The derived average pixel value I'k is stored in the predetermined storage region. Then, with the second sensor sensitivities and the average pixel value I'k, the noise gap amount derivation unit 406 estimates a virtual standard deviation $\sigma_k$ assuming a case where there is no shadow-detail loss in the region $R_k$ in the frame image i−1, in accordance with equation (5) below (S1706).

$$\sigma_k(I_k) = \sqrt{p\frac{ISO_{S2}}{ISO_{L2}}I'_k + \sigma_{dark}}$$

Equation (5)

The camera noise can be derived in accordance with equation (5) with a shot noise parameter p and a dark current noise $\sigma_{dark}$ determined by the sensor sensitivity. In this example, the shot noise parameter p=0.63 and the dark current noise $\sigma_{dark}=0.72$ with $ISO_{S2}=800$. The estimated standard deviation $\sigma_k$ is stored in the predetermined storage region.

As described above, in the noise gap amount derivation process in the present embodiment, the standard deviation of any divided region with an average luminance being a threshold value or lower, that is, any divided region which may possibly have shadow-detail loss, is estimated from the sensor sensitivities. In this way, the noise gap amount is accurately derived even in the case where the divided region corresponding to the dark portion has shadow-detail loss.

Other Embodiments

Embodiment(s) of the technique of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to reduce the noise gap that appears at the boundary between light and dark portions in HDR composition of images captured in a time-division manner.

While the technique of the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164406, filed Sep. 3, 2018, which is hereby incorporated by reference herein in its entirety.

What is claimed is:

1. An image processing apparatus comprising:
   one or more processors; and
   a memory including instructions stored thereon that, when executed by the one or more processors, cause the image processing apparatus to:
   obtain a plurality of captured images of an object captured under exposure conditions having different SN ratio characteristics;
   generate a high-dynamic range image by combining the plurality of captured images;
   divide the generated high-dynamic range image into a plurality of regions;
   derive a noise gap amount representing a difference in noise amount between the divided regions obtained by the division; and
   update at least one of the exposure conditions on a basis of the noise gap amount.

2. The image processing apparatus according to claim 1, wherein one of the exposure conditions is ISO sensitivity.

3. The image processing apparatus according to claim 1, wherein at least one of the exposure conditions is updated such that an SN ratio for each pixel value of the high-dynamic range image is increased according to the noise gap amount.

4. The image processing apparatus according to claim 1, wherein
   the updated exposure condition is stored in a storage apparatus, and
   in a case where the updated exposure condition is already stored in the storage apparatus, the exposure condition will not be updated.

5. The image processing apparatus according to claim 4, wherein the instructions, when executed by the one or more processors, further cause the image processing apparatus to:
   determine whether the at least one exposure condition needs to be updated, and
   in a case where the updated exposure condition is already stored in the storage apparatus but it is determined that the at least one exposure condition needs to be updated, the at least one exposure condition is updated on a basis of the derived noise gap amount.

6. The image processing apparatus according to claim 5, wherein it is determined that that the exposure condition needs to be updated in a case where a maximum pixel value and a minimum pixel value of the generated high-dynamic range image change.

7. The image processing apparatus according to claim 1, wherein
   a difference in standard deviation of pixel values is derived between the high-dynamic range image and each of the plurality of captured images for each of the divided regions, and
   the noise gap amount between the divided regions is derived on a basis of the derived difference in the standard deviation.

8. The image processing apparatus according to claim 1, wherein
   the plurality of captured images include a low-exposure image and a high-exposure image larger in exposure amount than the low-exposure image, and
   in a case where any of regions in the low-exposure image corresponding to the divided regions is detected as a region with an average pixel value being a predetermined threshold value or smaller, a standard deviation is derived, as a standard deviation of pixel values of the detected region, estimated from an average pixel value of a region in the high-exposure image corresponding to the detected region and the exposure conditions.

9. The image processing apparatus according to claim 1, wherein the high-dynamic range image id divided into the plurality of regions on a basis of pixel values thereof.

10. The image processing apparatus according to claim 1, wherein the high-dynamic range image is divided into a plurality of frequency bands according to a spatial frequency characteristic thereof, and a value id derived, as the noise gap amount, by adding differences in spatial frequency characteristic between the high-dynamic range image and each of the plurality of captured images in the plurality of divided frequency bands with the differences weighted according to the plurality of frequency bands.

11. The image processing apparatus according to claim 1, wherein in a case where one of the exposure conditions is an exposure condition which cannot be set on an image capturing apparatus that captures the plurality of captured images, an exposure condition which can be set on the image capturing apparatus is set and the number of images to be captured under the exposure condition is added and averaged, instead of updating the one exposure condition.

12. The image processing apparatus according to claim 1, wherein the at least one exposure condition is not updated in a case where the derived noise gap amount is a predetermined threshold value or smaller.

13. The image processing apparatus according to claim 1, wherein the instructions, when executed by the one or more processors, further cause the image processing appartus to display information enabling identification of any of the divided regions with the noise gap amount larger than a predetermined threshold value, on a user interface along with the high-dynamic range image.

14. The image processing apparatus according to claim 1, wherein
the plurality of captured images are images continuously captured at a predetermined time interval.

15. The image processing apparatus according to claim 1, wherein
a plurality of captured images obtained by capturing a moving image of the object,
the processes of combining, dividing, deriving, and updated are repetitively performed with respect to all of the plurality of captured images.

16. The image processing apparatus according to claim 1, wherein
the exposure conditions include an exposure time.

17. The image processing apparatus according to claim 1, wherein
low-exposure images and high-exposure images as the plurality of images.

18. The image processing apparatus according to claim 1, wherein the instructions, when executed by the one or more processors, further cause the image processing appartus to display each image according to the noise gap amount.

19. An image processing method comprising:
obtaining a plurality of captured images of an object captured under exposure conditions having different SN ratio characteristics;
generating a high-dynamic range image by combining the plurality of captured images;
dividing the generated high-dynamic range image into a plurality of regions;
deriving a noise gap amount representing a difference in noise amount between the divided regions obtained by the division; and
updating at least one of the exposure conditions on a basis of the noise gap amount.

20. A non-transitory computer readable storage medium storing a program which causes a computer to execute a method comprising:
obtaining a plurality of captured images of an object captured under exposure conditions having different SN ratio characteristics;
generating a high-dynamic range image by combining the plurality of captured images;
dividing the generated high-dynamic range image into a plurality of regions;
deriving a noise gap amount representing a difference in noise amount between the divided regions obtained by the division; and
updating at least one of the exposure conditions on a basis of the noise gap amount.

* * * * *